United States Patent [19]

Evans et al.

[11] Patent Number: 5,023,287

[45] Date of Patent: Jun. 11, 1991

[54] RUBBER CONTAINING MATRIX-ANTIDEGRADANTS

[75] Inventors: Larry R. Evans, Seville; Walter H. Waddell, Fairlawn; Frank W. Harris, Akron; David A. Benko, Munroe Falls, all of Ohio

[73] Assignee: The Goodyear Tire & Rubber Company, Akron, Ohio

[21] Appl. No.: 116,850

[22] Filed: Nov. 5, 1987

[51] Int. Cl.$^5$ .............................................. C08K 5/18
[52] U.S. Cl. .................... 524/255; 524/256; 524/258; 524/928; 524/929
[58] Field of Search ............... 524/928, 925, 929, 255, 524/256, 258; 523/206, 220, 351; 241/DIG. 31; 525/215, 236; 152/525, 510, 511

[56] References Cited

U.S. PATENT DOCUMENTS

| | | | |
|---|---|---|---|
| 3,073,371 | 1/1963 | Leeper | 152/525 |
| 3,554,959 | 1/1971 | Hammersley et al. | 524/925 |
| 3,704,741 | 12/1972 | Turk | 152/525 |
| 4,092,285 | 5/1978 | Leo et al. | 524/925 |
| 4,552,929 | 11/1985 | Devaux et al. | 525/236 |

OTHER PUBLICATIONS

Z. T. Ossefort "Ozone Resistance of Elastomeric Vulcanizates" *Symposium on Effect of Ozone on Rubber* pp. 39-56 Am. Society for Testing Matls. (1958).
Mascia, L. *The Role of Additives in Plastics* pp. 12 to 15, 1974.

*Primary Examiner*—Veronica P. Hoke
*Attorney, Agent, or Firm*—Bruce J. Hendricks; D. O. Nickey

[57] ABSTRACT

There is disclosed the use of matrix-antidegradants in rubber and a process for the production of matrix-antidegradants. More specifically, this invention is directed to microparticles of vulcanized rubber containing high levels of para-phenylenediamine type antiozonants which have a particle diameter of 100 microns or less. The matrix-antidegradant or microparticles prepared according to this invention provide long term protection to rubber articles that are subject to ozone and oxygen attack.

19 Claims, No Drawings

RUBBER CONTAINING MATRIX-ANTIDEGRADANTS

TECHNICAL FIELD

This invention relates to the enhanced protection of rubbers from oxidative degradation and ozonolysis. Specifically, this invention relates to a process for the preparation of microparticles of vulcanized rubber containing para-phenylenediamine type antidegradants and the use of these microparticles in rubbery polymers.

BACKGROUND ART

The use of rubber articles has always been subject to the problem of oxygen and ozone degradation. Over the years numerous solutions have been proposed to lessen or eliminate the destruction of the rubbery polymers by attack from ozone and/or oxygen. Typically antidegradants have been incorporated into the rubber compound to lessen or eliminate the degradation process.

More recently, several new approaches have been submitted to further enhance a rubber's ability to resist ozone and oxygen degradation. These new approaches include higher molecular weight materials, polymer bound materials and specific blends of antioxidants and/or antiozonants with waxes, rosins and the like. One problem that the prior art approaches have failed to solve is that the antiozonant at the rubber article surface is depleted after several years of service. This is especially true of articles such as truck tires that may be recapped or retreaded three or more times. In such use the rubber, especially the tire sidewall, must exhibit extended antiozonant protection so that the tire carcass may be used to its fullest potential.

In general, the approach of this invention is to place the antidegradant in a matrix of vulcanized rubber and grind the rubber into a microparticle with a diameter of 100 microns or less. The microparticles are compounded into rubber formulations that are used for tires and other rubber articles. The matrix material is selected based upon its higher solubility for the antidegradant than the rubber compound in which the microparticles are incorporated and thus the microparticles act as antidegradant reservoirs. A slow release of the antidegradant is achieved as the antidegradant diffuses from the microparticle reservoir into the rubber compound. This migration or diffusion provides a surface concentration of the antidegradant at an appropriate level. The critical or minimum concentration of the antidegradant needed to protect the rubber article from oxygen or ozone attack is thus maintained for longer periods of time. Through the use of the matrix-antidegradant of this invention, the effective service life of a rubber article is greatly enhanced.

In general, the present invention utilizes a controlled release system for the delivery of a rubber antidegradant as it is needed. The controlled release system or matrix system uses a polymer matrix that contains high levels of the antidegradant. The matrix polymer does not chemically disintegrate or erode, but rather releases the antidegradant to the bulk of the rubber article for migration to the surface through diffusion. One critical aspect of this invention resides in the discovery that a partitioning coefficient of at least 2 is necessary. The partitioning coefficient is a measure of the relative solubility of the antidegradant in the matrix polymer versus the stock or host polymer. One benefit of the matrix system is that it can facilitate handling. For example, a matrixed liquid may be handled much like a free flowing powder, while controlled release of the desired material may actually reduce the amount of active ingredient needed to do the job. In the pharmaceutical industry, controlled release systems have been used to sustain a minimum effective dose level for extended periods of time.

Through extensive research and effort, the inventors herein have developed a matrix system using specific components and specific processing parameters to provide enhanced protection to a rubber article from oxygen and ozone attack.

The use of granulated vulcanized rubber in rubber compounds has been known for some time as a method for recycling waste rubber. The use of recycled rubber has found limited acceptance since the physical properties of final product are usually less than desired. Further, some granulation or grinding methods use chemicals and energy intensive mechanical devices that substantially increases the cost.

U.S. Pat. Nos. 4,046,834 and 4,098,737 disclose a method for converting vulcanized rubber into finely divided vulcanized rubber which comprises 1) contacting the vulcanized rubber with a fatty acid; 2) adding solid alkali; 3) forming a dispersion with water using a disc mill; and 4) removing the finely divided rubber from the dispersion. U.S. Pat. Nos. 4,449,670; 4,449,674; 4,597,535; 4,469,284; 4,614,310: and 4,625,922, which are incorporated herein by reference, describe a comminuting apparatus for grinding vulcanized rubber and methods of obtaining microparticles of vulcanized rubber without the use of a softening agent, alkali and the like. The present invention preferably uses the microparticles produced through the apparatus and methods disclosed in these six U.S. Pat. Nos..

U.S. Pat. No. 4,092,285 discloses a composition of matter useful for rapidly and homogeneously dispersing a chemical in a rubber-or plastic compound, said composition comprising from about 60 to about 95 percent by weight of the chemical and from about 5 to about 40 percent by weight of a binder, said binder comprising at least one component selected from 1) liquids compatible with said rubber or plastic compound and with the other binder components; and 2) waxes having a sharp melting point in the range of about 55 to 80° C.; and 3) a polymer having a molecular weight of at least about 50,000 which when combined with the other binder components produces a binder which is a non-tacky gel below about 53° C. and returns to a liquid above about 53° C..

The prior art does not suggest nor does it disclose a microparticle reservoir concept or matrix-antidegradant for stockpiling additional antidegradant necessary to extend the useful lifetime of rubber products. It is not possible to simply incorporate higher levels of antidegradants into the rubber compound without detrimentally impacting its physical properties. Further, high levels of free antiozonant only increases the initial surface concentration above the level required for effective protection without significantly extending the time prior to failure. A matrix-antidegradant or microparticle reservoir approach stockpiles needed antidegradant which is slowly released to the rubber compound when the compound's level of antiozonant is depleted below a critical concentration. This release of the antidegradant from the matrix polymer to the stock to be protected is accomplished through the proper selection of the matrix polymer with a partitioning coefficient of at least 2 with respect to the rubber stock to be protected.

The Applicants have discovered that the preparation of a matrix-antidegradant as described and claimed herein will survive Banbury mixing at temperatures in excess of 110° C. and survive the curing process which achieves temperatures in excess of 150° C.. Further, it was unexpectedly observed that the products prepared according to this invention were compatible with rubber formulations and provided protection for the useful lifetime of the tire or the rubber object. In addition, it was discovered that the matrix-antiozonant controls the rate at which the antiozonant becomes available for consumption at the surface of the rubber article and therefore, greatly extends the effective lifetime of the rubber article.

DISCLOSURE OF THE INVENTION

There is disclosed a composition comprising a diene containing polymer and a matrix-antidegradant: wherein the matrix-antidegradant has a particle diameter of 100 microns or less and a partitioning coefficient of greater than 2.

There is also disclosed a finely-divided, vulcanized matrix-antidegradant which comprises 30–90% by weight of a matrix polymer selected from butyl rubber, polyisoprene, polybutadiene, SBR, polychloroprene, polynorbornene, nitrile rubbers and blends thereof; 10–70% by weight of an antidegradant selected from the para-phenylenediamines and substituted derivatives: 0–80% by weight of carbon black; 0–50% by weight of processing oils and waxes: and a curative package: said finely-divided matrix-antidegradant has a particle size of less than 100 microns and a partitioning coefficient of greater than 2 relative to the rubber stock to be protected.

There is further disclosed an improved rubber vulcanizate, said rubber vulcanizate is prepared by the process comprising:

(A) combining a vulcanizable diene elastomer with a matrix-antidegradant, said matrix-antidegradant and diene elastomer have a partitioning coefficient of at least 2; wherein the matrix-antidegradant is prepared by a process comprising:

(1) combining an antidegradant with a matrix polymer;

(2) vulcanizing the matrix polymer/antidegradant compound:

(3) grinding the resulting matrix vulcanizate to a particle diameter of 100 microns or less; and (B) vulcanizing the diene elastomer/matrix-antidegradant combination.

There is also disclosed a process for the preparation of a matrix-antidegradant which comprises:

(1) combining an antidegradant with a matrix polymer wherein the matrix polymer is selected with respect to the rubber stock to be protected, so that a partitioning coefficient of at least 2 is realized:

(2) vulcanizing the matrix polymer/antidegradant compound:

(3) grinding the resulting matrix vulcanizate to a particle diameter of 100 microns or less.

BEST MODE

The present invention is, in general, accomplished by loading a matrix polymer such as nitrile rubber with a high level of the antidegradant, vulcanizing the compound and then grinding, pulverizing or abrading the compound to particles of about 100 microns or less. The diameter of the matrix-antidegradant is important since particles above 100 microns have the tendency to reduce physical properties, such as tear and elongation of the final host vulcanizate. The matrix-antidegradant is incorporated into a rubber compound which is in need of protection from oxygen and/or ozone which may also include free antidegradants.

The antidegradants (i.e. para-phenylenediamines and substituted derivatives) are incorporated (generally 10–70% by weight) into a matrix polymer such as nitrile rubber, styrene-butadiene rubber, polybutadiene rubber, neoprene rubbers and the like by normal mixing/milling procedures. Carbon black, silica and/or other fillers (generally 0–50% by weight) may also be added. The compound is then cured, using conventional curing packages, ground into microparticles (i.e. less than 100 microns), and then incorporated into rubber stocks used in hoses, belts and tires. The matrix polymer is selected based upon its higher solubility for the antidegradant than in the rubber stock or host in which matrix antidegradant is incorporated. This solubility factor is the partitioning coefficient and must be at least 2, more preferably 4 or greater. A slow release of the antidegradant, i.e. antiozonant, is then achieved as the antiozonant diffuses from the rubber stock to the surface of the article, and from the microparticle reservoir to the rubber stock. The diffusion or migration of the antiozonant is based upon solubility differences of the microparticle and rubber stock for the antiozonant (partitioning coefficient). Thus, the critical concentration of antiozonant needed to protect the surface of the rubber article from oxidative degradation and ozone attack can be maintained for longer periods of time.

The rubber antidegradants that may be used to prepare the matrix antidegradant include all those presently known and used in the rubber industry. The major classes of antidegradants are the phenolics, phosphites, thioesters, amines, quinolines and materials which combine these functional groups. The phenolic class retards oxidation by the chain breaking mechanism. This class can be divided into the subgroups of monophenols, bisphenols and thiobisphenols, polyphenols and hydroquinone derivatives. Representative of the phenolics are compounds such as 2,6-di-tert-butyl-4-methylphenol, butylated hydroxytoluene, 2,2'-methylenebis (4-methyl-6-tert-butylphenol), butylated reaction product of paracresol and dicyclopentadiene, tert-butylhydroquinone and the like. Representative of the phosphite class are compounds such as tris(nonylphenyl)phosphite, bis(2,4-di-tert-butyl)pentaerythritol diphosphite and the like. Other compounds that may be used according to the invention include 2,5-di-tert-amylhydroquinone, N-phenyl-1-naphthylamine, para-oriented styrenated diphenylamine, octylated diphenylamines, 6-dodecyl-2,2,4-trimethyl-1,2-dihydroquinoline, N-phenyl-N -(1,3-dimethylbutyl)-para-phenylenediamine, diaryl-para-phenylenediamines, dialkyl-paraphenylenediamines, and the like. These antidegradants are known and most are commercially available.

Rubber compounds that utilize polymers subject to deterioration that can be conveniently protected by the matrix antidegradant described herein include substituted and unsubstituted, saturated and unsaturated, natural and synthetic polymers. The oxidizable natural polymers include natural rubber in its various forms, e.g., pale crepe and smoked sheet, and balata and gutta percha. The oxidizable synthetic polymers are prepared from a single monomer (homopolymer) or a mixture of two or more copolymerizable monomers (copolymer) wherein the monomers are combined in a random distribution or block form. The monomers may be substituted or unsubstituted and may possess one or more double bonds, for example, diene monomers, both conjugated and nonconjugated, and monoolefins including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethylidene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are 1-methylstyrene, methacrylic acid, methyl methacrylate, itaconic acid, ethyl methacrylate, glycidyl methacrylate and vinylidene chloride. Representative examples of the synthetic polymers that can benefit from the practice of this invention are polychloroprene: homopolymers of a conjugated 1,3-diene such as isoprene and butadiene, and in particular, polyisoprenes and polybutadienes having essentially all of their repeat units combined in a cis-1,4-structure; copolymers of a conjugated 1,3-diene such as isoprene and butadiene with up to 50 percent by weight of at least one copolymerizable monomer including ethylenically unsaturated monomers such as styrene or acrylonitrile; butyl rubber, which is a polymerization product of a major proportion of a monoolefin and a minor proportion of a multiolefin such as butadiene or isoprene; polyurethanes containing carbon to carbon double bonds: and polymers and copolymers of monoolefins containing little or no unsaturation, such as polyethylene, polypropylene, ethylene propylene copolymers and terpolymers of ethylene, propylene and a nonconjugated diene such as dicyclopentadiene, 1,4-hexadiene and ethylidene norbornene. The rubber compounds preferably protected by this invention are cis-1,4-polyisoprene (natural or synthetic), polybutadiene, and the copolymers of styrene and butadiene and blends thereof.

Those skilled in the art of rubber compounding will appreciate that the polymers subject to degradation will be admixtures with conventional rubber compounding ingredients such as oils, carbon black, sulfur, accelerators and the like.

EXAMPLE 1

Effect of Free Antiozonant

Various levels of a commercially available antiozonant were mixed into a vulcanizable diene-containing elastomer composition using a two-step Banbury mixing process. Step one involved the preparation of a masterbatch while step two incorporated curing agents and antidegradants into the masterbatch. The following sets forth the formulation:

TABLE I

| Preparation of Masterbatch | |
|---|---|
| Component | Parts by Weight |
| Polyisoprene | 40 |
| Polybutadiene | 60 |
| Carbon black | 50 |
| Stearic acid | 1.0 |
| Extender oil | 5.0 |
| Zinc oxide | 3.0 |
| Sulfur | 2.25 |
| Accelerator | 0.50 |
| Antidegradant* | Variable |

*N-phenyl-N'-(1,3-dimethylbutyl)-para-phenylene-diamine (hereinafter AOZ)

After standard mixing and sheeting, 15×15×0.19 cm test sheets were cured at 150° C. for about 20 minutes. Test samples were prepared for each compound and placed in an ozone chamber. Table II sets forth the sample number, the level of free AOZ (parts per hundred rubber) and the days to failure.

TABLE II

| Level of Free AOZ on Ozone Life* | | |
|---|---|---|
| Sample No. | AOZ (phr) | Ozone Life (days) |
| 1 | 0 | 1 |
| 2 | 2.0 | 11 |
| 3 | 3.0 | 14 |
| 4 | 4.0 | 21 |
| 5 | 6.0 | 22 |
| 6 | 8.0 | 20 |

*Ozone life is the time when sample failure occurred using ASTM D3395 with a cycled ozone on/off procedure.

The data indicate that additional levels of free AOZ above about 4 phr do not extend substantially the lifetime of the rubber compound. In fact, at the 8.0 phr level, the compound appears to be pro-degradative and thus fails sooner than the 6.0 and 4.0 phr levels. From this information it is quite clear that simply increasing the level of AOZ in the compound will not extend the useful life of a rubber article beyond a certain point.

EXAMPLE 2

AOZ PARTITIONING COEFFICIENTS

The following recipe was used to prepare the matrix-antidegradant:

TABLE III

| Matrix-antidegradant Recipe | |
|---|---|
| Compound | Parts by Weight |
| Matrix rubber | 100 |
| Carbon black | 50 |
| Stearic acid | 2.5 |
| AOZ | 40 |
| Zinc oxide | 1.0 |
| Sulfur | 2.1 |
| Accelerator | 1.35 |

The matrix rubber was varied and included polyisoprene, polybutadiene, butyl rubber, styrene/butadiene rubber, polychloroprene, EPDM, polynorbornene, and nitrile rubbers with acrylonitrile contents of 18, 21, 24, 32, 45 and 55%. After mixing of these matrix rubbers, the compounds were sheeted and cured for 17 minutes at 150° C. against similar sheets of the masterbatch from Table I which contained no antidegradant. These experiments were conducted to determine the partitioning coefficient. By partitioning coefficient, it is meant the relative solubility or preference of the antidegradant for the matrix polymer versus the polymer or stock to be protected.

TABLE IV

AOZ Partitioning Coefficients of Matrix Rubbers Versus Polyisoprene/Polybutadiene Blend

| Matrix Rubber from Table III | Partitioning Coefficient* |
|---|---|
| Polyisoprene | 0.8 |
| Polybutadiene | 1.1 |
| Butyl rubber | 0.2 |
| SBR | 1.1 |
| Polychloroprene | 0.9 |
| EPDM | 0.6 |
| Polynorbornene | 1.7 |
| NBR (18% ACN)** | 2.2 |
| NBR (21% ACN) | 2.7 |
| NBR (24% ACN) | 2.9 |
| NBR (32% ACN) | 3.5 |
| NBR (45% ACN) | 4.0 |
| NBR (55% ACN) | 4.4 |

*Ratio of AOZ in matrix rubber to that in masterbatch described in Table I after 5 days at 95° C., measured by extraction and HPLC (high pressure liquid chromatography) quantification.
**ACN is acrylonitrile From Table IV it can be seen that the nitrile rubber containing 55% ACN had the greatest partitioning coefficient which indicates a limited migration of the AOZ from the matrix rubber to the masterbatch which is a polyisoprene/polybutadiene blend.

EXAMPLE 3

MATRIX-AOZ

Samples of the matrix rubbers from Table IV were cured and ground to a particle size of about 50 microns using the procedure and apparatus described in U.S. Pat. No. 4,597,536.

A 28.5 part loading of each of the ground matrix-antidegradants was added to the masterbatch rubber of Table I so as to result in 6.0 phr total.

After mixing of the masterbatch and the matrix-AOZ, the compounds were sheeted and cured. Samples of each were placed in an ozone chamber and evaluated.

TABLE V

Effect of Matrix-AOZ on Rubber Lifetime

| Sample No. | Matrix-AOZ | Ozone Lifetime (Days)* |
|---|---|---|
| 7 | Control (6.0 phr free AOZ in masterbatch) | 21 |
| 8 | Polybutadiene | 20 |
| 9 | Polynorbornene | 22 |
| 10 | Nitrile 18% ACN** | 22 |
| 11 | Nitrile 21% ACN | 24 |
| 12 | Nitrile 24% ACN | 24 |
| 13 | Nitrile 32% ACN | 27 |
| 14 | Nitrile 45% ACN | 29 |
| 15 | Nitrile 55% ACN | 31 |

*Ozone lifetime is the time when sample failure occurred using ASTM D3395 with a cycled ozone procedure.
**ACN is acrylonitrile.

The data indicate that the matrix rubbers with the higher partitioning coefficients provided the best protection of the masterbatch against ozone degradation. In particular, those combinations having a partitioning coefficient of 2 or greater, especially 4 or greater, were exceptionally resistant to ozone.

From the tables, it can be concluded that a rubber stock/matrix rubber partitioning coefficient of 4 or greater will result in an AOZ system that provides outstanding protection from ozone attack. Of course, the concept of this invention will demonstrate an improvement over free AOZ as long as the partitioning coefficient is above 2.

A 28.5 part loading of the matrix-AOZ prepared from nitrile rubber with 55% ACN was added to the masterbatch of Table I so as to result in 6.0 phr AOZ. An additional masterbatch was prepared with 6.0 phr free AOZ. After mixing, both stocks were molded into 90×35 cm wedge shaped samples and cured. Table VI shows the effects of outdoor exposure on these stocks.

TABLE VI

| | Weather Exposure* | | |
|---|---|---|---|
| Sample No. | | Time to First Crack (Months) | Time to Sample Failure (Months) |
| 16 | 6.0 phr free AOZ | 2 | 6 |
| 17 | 6.0 phr matrix-AOZ | None** | None** |

*Outdoor atmosphere (Akron, Ohio); samples were continuously subjected to cycled strain.
**No cracks observed after one year.

The data indicate that the matrix-AOZ significantly extended the crack-free lifetime of the rubber stocks.

To optimize the amount of the AOZ in the matrix polymer, varying levels of AOZ were incorporated into the nitrile having 55% ACN using the recipe set out in Table III.

In a manner similar to Example 3, the various matrix-antidegradants were incorporated after curing and grinding into the masterbatch stock of Table I except that 3.5 phr matrix-AOZ and 2.5 phr free AOZ were incorporated into each sample. The samples were sheeted, cured and placed in the ozone chamber.

TABLE VII

AOZ in Matrix (55% ACN Nitrile Rubber)

| Sample No.* | AOZ in Matrix (phr)** | Ozone Life (Days)*** |
|---|---|---|
| 18 | 18 | 28 |
| 19 | 24 | 32 |
| 20 | 30 | 35 |
| 21 | 35 | 42 |
| 22 | 40 | 36 |
| 23 | 48 | 37 |

*All stocks contained 6.0 phr total AOZ which comprised 2.5 phr free AOZ and 3.5 phr in matrix form.
** Level of AOZ in the matrix.
***Time to sample failure using ASTM D3395 with a cycled ozone procedure.

EXAMPLE 4

MATRIX-AOZ/FREE AOZ OPTIMIZATION

To determine the optimum level of matrix-AOZ and free AOZ in the rubber stock to be protected, the following experiment was conducted. With the 55% ACN nitrile matrix containing 35 phr AOZ, various combinations of free AOZ and matrix-AOZ were prepared and tested in the masterbatch of Table I.

TABLE VIII

| | Matrix-AOZ/Free AOZ* | | |
|---|---|---|---|
| Sample No. | Matrix AOZ (phr)** | Free AOZ (phr) | Ozone Life (Days)*** |
| 24 | 6.0 | 0 | 36 |
| 25 | 5.0 | 1.0 | 37 |
| 26 | 4.0 | 2.0 | 38 |
| 27 | 3.0 | 3.0 | 42 |
| 28 | 2.0 | 4.0 | 36 |
| 29 | 1.0 | 5.0 | 37 |

TABLE VIII-continued

| Sample No. | Matrix-AOZ/Free AOZ* | | Ozone Life (Days)*** |
|---|---|---|---|
| | Matrix AOZ (phr)** | Free AOZ (phr) | |
| 30 | 0 | 6.0 | 21 |

*Total level of 6.0 phr AOZ (free plus matrix).
**Effective AOZ levels obtained by adding nitrile rubber with 55% ACN containing 35 phr AOZ.
***ASTM D3395.

Table VIII demonstrates that the optimum combination is 3.0 phr matrix-AOZ and 3.0 phr free AOZ. All of the samples tested are far superior to just free AOZ in the polymer at the 6.0 phr level. The full embodiment of this invention contemplates the combined use of matrix antidegradants and free antidegradants to realize the greatest protection for the rubber stock.

EXAMPLE 5

SURFACE CONCENTRATION

Experiments were conducted to demonstrate that the use of the matrix-AOZ in combination with free AOZ will prevent the premature depletion of the AOZ at the surface of the rubber article.

The 55% ACN nitrile rubber containing 35 phr AOZ was used as the matrix-AOZ to prepare samples as in Example 3.

The surface concentration of the AOZ after ozone exposure was determined by removing the specimens from the ozone chamber and washing the surface with 5 cc of methylene chloride. The AOZ concentration in the washings was quantitatively determined by high pressure liquid chromatography (HPLC) using an absorbance detector.

TABLE IX

| Free AOZ vs Matrix/Free AOZ Blend | | | | | | |
|---|---|---|---|---|---|---|
| Days Exposure to Ozone* | 5 | 10 | 15 | 20 | 25 | 30 |
| Sample #31 6.0 phr Free AOZ | | | | | | |
| Cracking** | 0 | 0 | 0 | 18 | 48 | 60 |
| Surface Con. (ug/cm²) | 320 | 280 | 400 | 200 | 150 | 50 |
| Sample #32 2.5 phr Free AOZ + 3.5 phr Matrix-AOZ | | | | | | |
| Cracking | 0 | 0 | 0 | 0 | 10 | 24 |
| Surface Con. (ug/cm²) | 300 | 290 | 320 | 340 | 280 | 200 |

*ASTM D3395.
**Values are a crack rating estimated as the product of crack size and crack density.

Table IX demonstrates that the combined use of a matrix-AOZ and free AOZ maintained an effective AOZ surface concentration throughout the test and thereby provided an extended crack free lifetime to the rubber compound.

Industrial Applicability

The rubber industry is constantly searching for methods to lessen or eliminate the degradation of rubber articles. The instant invention fills this need in the industry with a product and process that heretofore was unknown.

Through the instant invention a rubber article is afforded outstanding protection from ozone and oxygen attack by the slow, controlled release of an antidegradant.

While the illustrative embodiments of the invention have been described with particularity, it should be understood that various modifications will be apparent to and can be readily made by those skilled in the art without departing from the spirit and scope of the invention. Accordingly, it is not intended that the scope of the claims appended hereto be limited to the examples and description set forth herein, but rather that the claims be construed as encompassing all the features of patentable novelty which reside in the present invention, including all features which would be treated as equivalents thereof by those skilled in the art to which the invention pertains.

What is claimed is:

1. A composition comprising a polymer derived from a diene monomer and a polymer/antidegradant matrix; wherein the matrix has a particle diameter of 100 microns or less and a partitioning coefficient of greater than 2.

2. A composition according to claim 1 wherein the polymer derived from a diene monomer is selected from the group consisting of: polyisoprene, polybutadiene, styrene-butadiene copolymers and blends thereof.

3. A composition according to claim 1 wherein the matrix is a nitrile rubber containing from 20–40 phr of an antidegradant.

4. A composition according to claim 1 wherein the particle diameter of the matrix is 50 microns or less.

5. A composition according to claim 1 wherein the partitioning coefficient is greater than 4.

6. A finely-divided, vulcanized matrix which comprises 30–90% by weight of a polymer selected form butyl rubber, polyisoprene, polybutadiene, styrene-butadiene copolymers, polychloroprene, polynorbornene, nitrile rubbers and blends thereof, 10–70% by weight of an antidegradant selected from the para-phenylenediamines and substituted derivatives; 0–80% by weight of carbon black; 0–50% by weight of processing oils and waxes; and a curative package; said finely-divided matrix has a particle size of less than 100 microns and a partitioning coefficient of greater than 2 relative to the rubber stock to be protected.

7. A finely-divided vulcanized matrix according to claim 6 wherein the polymer is a nitrile rubber, and the antidegradant is N-phenyl-N'-(1,3-dimethylbutyl)-para-phenylenediamine.

8. A finely divided vulcanized matrix according to claim 6 wherein the matrix is a nitrile rubber containing from 20–40 phr of the antidegradant.

9. A finely divided vulcanized matrix according to claim 6 wherein the particle diameter of the matrix is 50 microns or less.

10. A finely divided vulcanized matrix according to claim 6 wherein the partitioning coefficient is greater than 4.

11. An improved rubber vulcanizate, said rubber vulcanizate is prepared by the process comprising:
(A) combining a vulcanizable diene elastomer with a matrix, said matrix and diene elastomer having a partitioning coefficient of at least 2; wherein the matrix is prepared by a process comprising:
(1) combining an antidegradant with a polymer;
(2) vulcanizing the polymer/antidegradant compound to form a matrix vulcanizate;
(3) grinding the resulting matrix vulcanizate to a particle diameter of 100 microns or less; and
(B) vulcanizing the diene elastomer/matrix combination.

12. An improved rubber vulcanizate according to claim 11, wherein the vulcanizable diene elastomer is selected from the group consisting of: polyisoprene, polybutadiene, styrene-butadiene copolymers and blends thereof.

13. An improved rubber vulcanizate according to claim 11, wherein the matrix is a nitrile rubber containing from 20-40 phr of an antidegradant.

14. An improved rubber vulcanizate according to claim 11, wherein the particle diameter of the matrix is 50 microns or less.

15. An improved rubber vulcanizate according to claim 11, wherein the partitioning coefficient is greater than 4.

16. A process for the preparation of a matrix which comprises:

(1) combining an antidegradant with a polymer wherein the polymer is selected with respect to the rubber stock to be protected, so that a partitioning coefficient at least 2 is realized;
(2) vulcanizing the matrix compound;
(3) grinding the resulting matrix vulcanizate to a particle diameter of 100 microns or less.

17. A process for the preparation of a matrix according to claim 16, wherein the matrix is a nitrile rubber containing from 20-40 phr of an antidegradant.

18. A process for the preparation of a matrix according to claim 16, wherein the particle diameter of the matrix is 50 microns or less.

19. A process for the preparation of a matrix according to claim 16, wherein the partitioning coefficient is greater than 4.

* * * * *